United States Patent
Porchia et al.

(10) Patent No.: US 6,994,335 B2
(45) Date of Patent: Feb. 7, 2006

(54) DISPOSABLE AND ABSORBENT CORRUGATED PAPERBOARD CUTTING BOARD

(75) Inventors: Jose Porchia, Milwaukee, WI (US); Barry T. Calpino, Racine, WI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 0 days.

(21) Appl. No.: 10/607,280

(22) Filed: Jun. 26, 2003

(65) Prior Publication Data

US 2004/0056403 A1  Mar. 25, 2004

Related U.S. Application Data

(60) Provisional application No. 60/391,697, filed on Jun. 26, 2002.

(51) Int. Cl.
*B23Q 3/00* (2006.01)
(52) U.S. Cl. ............... 269/302.1; 269/289 R
(58) Field of Classification Search ........... 269/289 R, 269/302.1, 303, 15, 13
See application file for complete search history.

(56) References Cited

U.S. PATENT DOCUMENTS

| 5,048,689 | A | * | 9/1991 | McFarland ............... 206/586 |
| 5,562,872 | A | * | 10/1996 | Watanabe ............... 264/145 |
| 5,577,989 | A | | 11/1996 | Neary |
| RE35,830 | E | | 6/1998 | Sadlier |
| 6,135,288 | A | | 10/2000 | Kim |
| 6,164,478 | A | * | 12/2000 | Cant ............... 220/62.1 |
| 6,179,203 | B1 | | 1/2001 | Toussant et al. |
| D441,261 | S | | 5/2001 | Stein |
| 6,422,551 | B1 | * | 7/2002 | Brotz ............... 269/289 R |
| 6,491,214 | B2 | | 12/2002 | Plummer et al. |
| 6,617,004 | B2 | * | 9/2003 | Lake et al. ............... 428/138 |
| 2003/0151186 | A1 | * | 8/2003 | Witte ............... 269/289 R |
| 2004/0007804 | A1 | * | 1/2004 | Porchia et al. ........... 269/289 R |
| 2004/0056403 | A1 | * | 3/2004 | Porchia et al. ........... 269/289 R |

FOREIGN PATENT DOCUMENTS

| DE | 296 02 348 U1 | 5/1996 |
| WO | WO 99/53810 | 10/1999 |
| WO | WO 02/30783 A1 | 4/2002 |

\* cited by examiner

*Primary Examiner*—Lee D. Wilson

(57) ABSTRACT

A disposable and absorbent cutting board may be constructed from a layer of corrugations and an absorbent layer. The corrugations may be relatively small and tightly spaced to provide the board with strength and rigidity. The absorbent layer may be made of non-woven cellulosic fibers and include one or more score lines to facilitate folding. A backing layer may also be provided, on the layer of corrugations opposite to the absorbent layer, to provide non-skid oliophilic or hydrophilic properties.

27 Claims, 2 Drawing Sheets

DISPOSABLE AND ABSORBENT CORRUGATED PAPERBOARD CUTTING BOARD

CROSS-REFERENCE TO RELATED APPLICATION

The application claims the priority benefits under 35 U.S.C. §119(e) of U.S. provisional patent application Ser. No. 60/391,697, filed on Jun. 26, 2002.

FIELD OF THE DISCLOSURE

The disclosure generally relates to kitchen aids and, more particularly, relates to cutting boards.

BACKGROUND OF THE INVENTION

Cutting boards are well known kitchen aids used to provide a solid surface for food preparation while protecting the underlying countertop, table, or the like from damage. The board absorbs the impact and shearing of the knife or other utensil being used without allowing the utensil to contact and damage the underlying surface.

Conventionally, such boards have been made of wood or stone such as granite. While such materials provide a hardness level desirable in terms of cut resistance and rigidity, they are also sufficiently porous to allow for liquid or other matter to seep into its pores and crevices. Over time and repeated usage, such absorption can lead to discoloration or contamination in terms of bacteria or mold growth. Even with regular washings, the board, once. used, may be less than completely sterile.

More recently, boards made of hard plastics, such as polypropylene or the like, have been employed. Such plastic materials do provide a less porous and more easily sterilizable surface, but often offer less cut resistance and thus can more quickly become marred or otherwise defaced. In addition, to certain consumers such materials are less aesthetically appealing than wood or stone, a particularly important, if not most important, criteria when purchasing a relatively low cost item.

In still further forms, cutting boards have begun to be provided in a completely disposable fashion. More specifically, such boards are designed to be used once and discarded. In order to make such a board, cost must be kept sufficiently low so as to allow the user to feel comfortable in throwing the item away after each use. At the same time, the board must be made of a material providing high cut resistance. Since the board is designed to be disposable, fluid imperviousness is not necessarily of concern, but fluid absorption, for purposes of ease of cleaning, is often a desirable feature. Moreover, it would be advantageous to provide such a disposable and absorbent cutting board which is deformable to facilitate dispensing and disposal, while at the same time providing sufficient texture or friction to serve as a non-skid surface when resting on a countertop.

SUMMARY OF THE DISCLOSURE

In accordance with one aspect of the disclosure, a disposable cutting board is disclosed which may comprise a layer of corrugations, an absorbent layer attached to the layer of corrugations, and a score line provided in at least one of the layer of corrugations and absorbent layer.

In accordance with another aspect of the disclosure, a method of using a disposable cutting board is disclosed which may comprise the steps of placing a cutting board atop a work surface, setting matter atop of the cutting board, cutting the matter while the matter is atop the cutting board, folding the cutting board along primary score lines to form a trough, and dispensing the matter from the cutting board by tilting the trough.

In accordance with another aspect of the disclosure, a disposable cutting board is disclosed which may comprise at least one layer of corrugations, an absorbent layer attached to a first side of the corrugations, a backing sheet attached to a second side of the corrugations, a first set of parallel score lines formed in the cutting board, and a second set of parallel score lines formed in the cutting board.

These and other aspects and features of the disclosure will become more apparent upon reading the following detailed description when taken in conjunction with the accompanying drawings.

Figure 1:
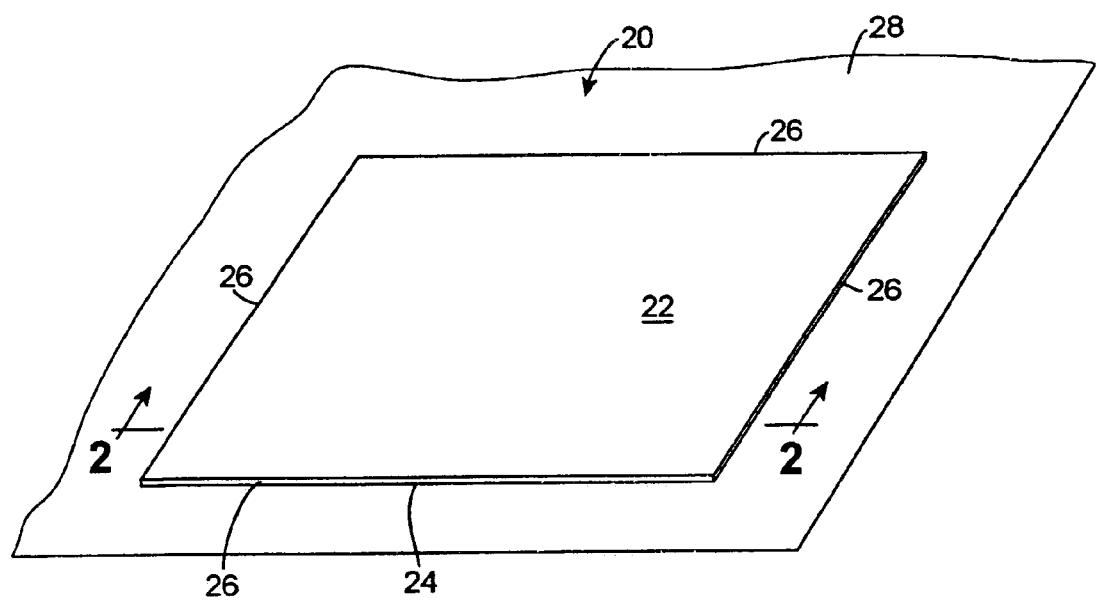
FIG. 1 is an isometric view of a disposable cutting board constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure.

DETAILED DESCRIPTION OF THE DISCLOSURE

Referring now to the drawings, and with specific reference to FIG. 1, a disposable and absorbent cutting board constructed in accordance with the teachings of the disclosure is generally referred to by reference numeral 20. While the cutting board 20 is depicted in generally rectangular shape, it is to be understood that the board could be constructed in any conceivable shape including, but not limited to, circles, ellipses, triangles, and other multi-sided polygons, as well as three dimensional shapes including those in the form of plates, bowls, pans, casserole dishes and the like.

The board 20 may include a top surface 22, a bottom surface 24, and a plurality of side edges 26. The bottom surface 24 is designed to rest against a surface 28 to be protected, such as a countertop, table, or the like. The top surface 22 is designed to have items to be cut or otherwise prepared placed thereon. The items, while not depicted, may include food items to be cut, such as but not limited to meats, vegetables, and fruits, as well as any non-food item wherein it is desired to protect an underlying surface from knife damage or liquid exposure. The board 20 is designed to prevent a utensil, such as knife or the like from penetrating therethrough and damaging the surface 28, while still enabling the item to be processed, and for the fluids generated by the process to be absorbed.

In accordance therewith, the board 20 may be constructed from multiple layers wherein at least one layer allows for knife penetration without substantially dulling the knife and at least one layer does not allow for knife penetration or requires greater force to penetrate than the other layer thereby protecting the underlying surface. Moreover, by allowing for knife penetration, the overall surface area of the board is increased, thereby enhancing the absorbency capabilities of the board. The use of materials such as microfibers allows for both knife penetration and absorbency.

Figure 2:
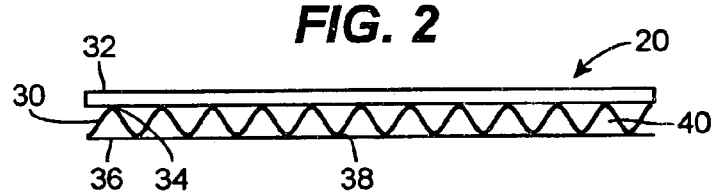
FIG. 2 is sectional view of the board of FIG. 1, taken along line 2—2 of FIG. 1.

Referring now to FIG. 2, the board 20 is shown in cross-sectional view. As shown therein, the board 20 may include a fortification layer 30, to which an absorbent layer 32 is joined proximate a top surface 34 of the fortification layer 30. A backing sheet or layer 36 may be joined to the fortification layer 30 proximate a bottom surface 38 of the fortification layer 30. As will be described in further detail herein, in the depicted embodiment the fortification layer 30 is manufactured from corrugated material such as paperboard and includes a plurality of corrugations or flutes 40. It is to the top and bottom surfaces 34, 38 of the flutes 40 that the absorbent layer 32 and backing sheet 36 are attached, respectively. Attachment may be through any suitable medium such as adhesive, glue, starch, stitching, or the like. In addition, the fortification layer 30 need not be manufactured from paperboard, but can be manufactured from any other suitable type of material such as other cellulosic materials (paper, fiberboard, particle board, veneer, etc.), or plastic such as, but not limited to, polypropylene.

Figure 3:
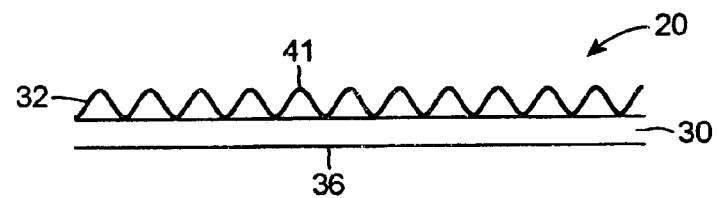
FIG. 3 is a sectional view of an alternative embodiment of a cutting board constructed in accordance with the teachings of the disclosure.
Figure 4:
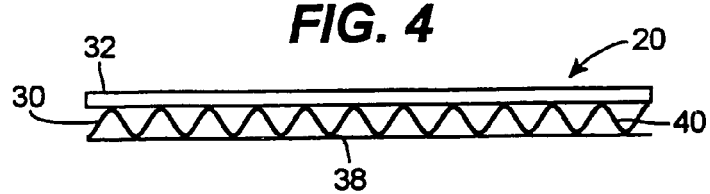
FIG. 4 is a sectional view of a second alternative embodiment of a cutting board constructed in accordance with the teachings of the disclosure.

The absorbent layer 32 may be manufactured from any suitable type of material including, but not limited to, any suitable form of cellulosic non-woven paper such as paper towel or tissue grade paper. Other materials including sponges, foams, and common cork materials are certainly possible. The non-woven fibers are attached together so that they are not transferred to food during food preparation atop the board 20. The absorbent material absorbs the liquids generated during food preparation and thereby renders a relatively clean underlying surface 28. As shown in FIG. 3, the absorbent material 32 can be fluted to provide even greater surface area for absorption of the generated liquids. If the absorbent layer 32 is corrugated, the flutes 41 of the layer 32 could serve as additional cushioning against knife impact and aid surface protection.

The fortification layer 30 is preferably manufactured from corrugated paperboard having microflutes and/or other relatively small, tightly spaced corrugations thereby to provide the board 20 with strength and rigidity necessary to provide adequate cut resistance and to protect the underlying surface 28 from damage. Moreover, microflutes result in a relatively thin product, adding to the aesthetics of the board 20, while at the same time making disposal easier, and storage more straightforward, given the slight bulk of the board 20. The fortification layer 30 may, moreover, include a plurality of overlapping layers of flutes to further strengthen the board 20. Such flute layers could be provided parallel to, or at transverse angles to, one another. Such flute layers could also be provided with different spacings (frequencies) between the flutes of each layer, at different heights (amplitudes), or with different thicknesses.

The backing sheet 36 can also be made from paperboard or other suitable materials such as, but not limited to, rubber, plastics (such as vinyl), and the like. The backing sheet 36 is advantageously provided in the form of a treated paper such as a hydrophilically or oliophilically treated paper which prevents water or oil absorption, while at the same time adding sufficient friction to provide a non-skid surface. In one embodiment, the backing sheet 36 and fortification layer 30 could be provided as single-faced corrugated paperboard. Such an embodiment could facilitate production in that single-faced corrugated paperboard is a readily available commercial product which could be purchased from a vendor in pre-fabricated form, to which the absorbent layer 32 could then be attached.

Figure 5:
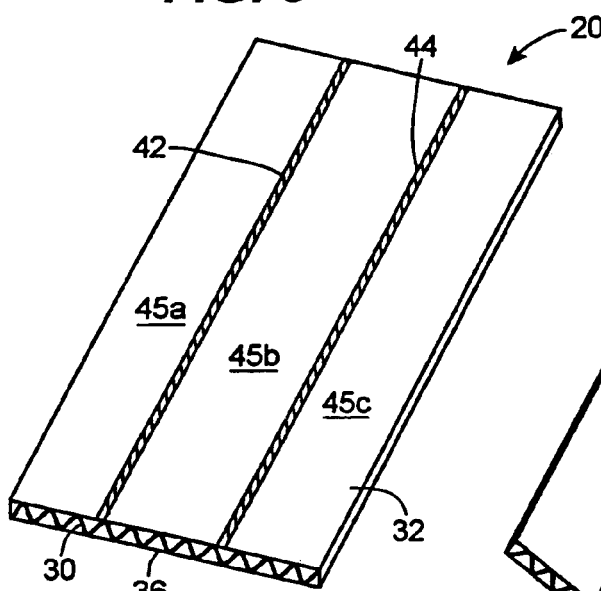
FIG. 5 is an isometric view of a third alternative embodiment of a cutting board constructed in accordance with the teachings of the disclosure.

Turning now to the embodiment of FIG. 5, another alternative embodiment is depicted which still includes the fortification layer 30 and absorbent layer 32, as well as a backing sheet 36, but further includes first and second score lines 42, 44 through the absorbent layer 32. Although not to be limited to such a dimension, score lines can be, for example, ⅛ to 1/16 inches in width, meaning that portions or strips of the absorbent layer 32 are removed in such widths along the length of the board 20. In so doing, it can be readily appreciated by one of ordinary skill in the art that the board 20 is thereby more easily bent in that the score lines 42, 44 serve as natural hinges about which the board 20 can pivot due to the reduced structural integrity at the score lines 42, 44. The score lines 42, 44 may be provided in any one of the fortification layer 30, absorbent layer 32, or backing sheet 36, or any combination thereof.

Figure 6:
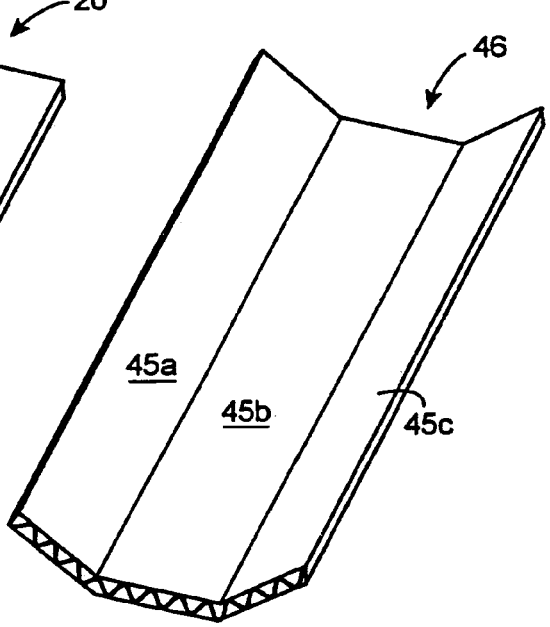
FIG. 6 is an isometric view of the embodiment of FIG. 5, but depicted in a dispersing trough position.

Such a feature may prove to be particularly advantageous after food preparation when it may be desirable to dispense the prepared food into another container. More specifically, the score lines 42, 44 can divide the board 20 into three flaps 45a, b, and c, such that the board 20 can be folded about the score lines 42, 44 and thereby form a curved trough as depicted in FIG. 6. Upon tilting the trough 46, the trough 46 serves to funnel food, prepared thereon, into another container, dish, or the like.

Figure 7:
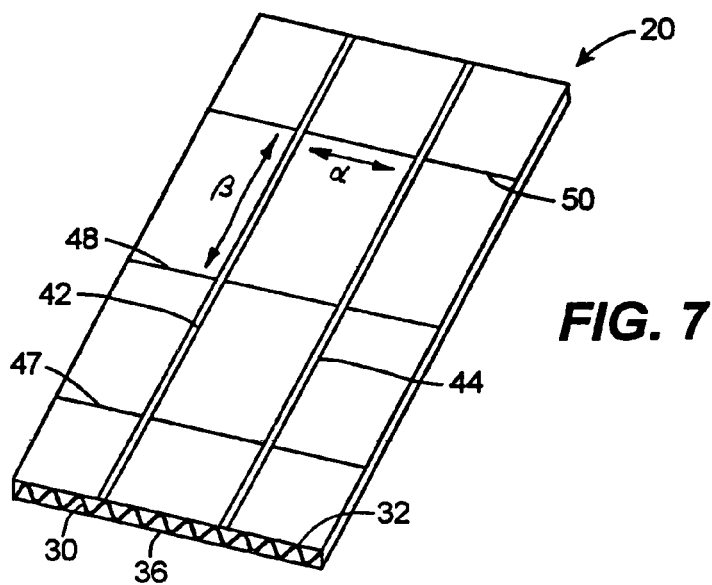
FIG. 7 is a perspective view of a fourth alternative embodiment of a cutting board constructed in accordance with the teachings of the disclosure.

In a still further embodiment, depicted in FIG. 7, it can be seen that in addition to score lines 42, 44, additional score lines 47, 48, 50 can be provided transverse to the score lines 42, 44. In so doing, the board 20 can be folded in multiple directions such as those represented by arrows α and β. This may prove to be particularly advantageous after use of the board 20 is concluded. More specifically, after use the board 20 may simply be folded or crumpled at each of the score lines 42–50 to thereby facilitate disposal into a waste receptacle or the like. The collapsing or crumpling of the board 20 can be used to reduce the board to twenty to twenty-five percent or less of its original shape. In further embodiments, it is to be understood that the board 20 could be provided with a greater or lesser number of score lines at a variety of angles to facilitate folding and disposing in a similar manner.

The board 20 can be manufactured in any number of manners, but advantageously through a web-processing line. For example, such a web-processing line (not shown) may include rolls of paper, or other material, adapted to form each of the absorbent layer 32, fortification layer 30, and backing sheet 36. Each would be provided with a splicing mechanism to ensure a continuous stream of material is provided to the line by connecting the end of a depleted roll to the beginning of a new roll. In so doing, downtime for the line can be abated. Downstream of such splicers, a plurality of rollers would be provided through which the webs forming the absorbent layer 32, fortification layer 30, and backing sheet 36 would be strained under tension. For layers requiring corrugations, pairs of intermeshing corrugating rolls or gear wheels would be provided. The web would be loaded and moistened prior to entering the corrugating rolls, such that the web would be deformed into corrugations upon passing through.

After exiting the corrugating rolls, starch or other suitable adhesives could be applied to the top and bottom of each flute, with the adjacent layers then being brought into engagement with the flutes, under nip rollers or the like, to bond the layers together. Air heaters or heated rollers may be provided to facilitate drying and curing. The multi-layered web would then be cut into individual boards 20 of any desired shape or dimension at the end of the manufacturing line.

From the foregoing, it will be appreciated by those of ordinary skill in the art that disposable and absorbent paperboard cutting boards can be constructed from the teachings provided herein. Moreover, those of ordinary skill in the art will understand that variations on the embodiments disclosed herein can be made without departing from the spirit and scope of the disclosure.

What is claimed is:

1. A disposable cutting board, comprising:
    a layer of corrugations;
    an absorbent layer attached to the layer of corrugations; and
    a score line provided in at least one of the layer of corrugations and absorbent layer, the cutting board being movable between a planar, cutting configuration to a curved, serving configuration by hingedly folding the cutting board about the score line.

2. The disposable cutting board of claim 1, wherein the score line is provided in the corrugations.

3. The disposable cutting board of claim 1, wherein the score line is provided in the absorbent layer.

4. The disposable cutting board of claim 1, further including a backing layer, the layer of corrugations being provided between the absorbent layer and the backing layer.

5. The disposable cutting board of claim 4, wherein the backing layer is manufactured from a cellulosic material.

6. The disposable cutting board of claim 4, wherein the backing layer is manufactured from a plastic material.

7. The disposable cutting board of claim 4, wherein the backing sheet is hydrophilic.

8. The disposable cutting board of claim 4, wherein the backing sheet is oleophilic.

9. The disposable cutting board of claim 1, wherein the layer of corrugations is manufactured from cellulosic material.

10. The disposable cutting board of claim 1, wherein the absorbent layer is manufactured from cellulosic material.

11. The disposable cutting board of claim 1, wherein the absorbent layer is manufactured from a sponge material.

12. The disposable cutting board of claim 1, wherein the absorbent layer is manufactured from foam material.

13. The disposable cutting board of claim 1, wherein the absorbent layer is manufactured from cork.

14. The disposable cutting board of claim 1, further including first and second parallel score lines.

15. The disposable cutting board of claim 14, further including third and fourth parallel score lines, the third and fourth score lines being transverse to the first and second score lines.

16. The disposable cutting board of claim 1, further including at least one additional layer of corrugations.

17. The disposable cutting board of claim 16, wherein the layers of corrugations are provided transverse to one another.

18. A method of using a disposable cutting board, comprising:
    placing a cutting board atop a work surface;
    setting matter atop the cutting board;
    cutting the matter while the matter is atop the cutting board;
    folding the cutting board along primary score lines to form a trough;
    dispensing the matter from the cutting board by tilting the trough; and
    folding the cutting board along secondary score lines transverse to the primary score lines to form a compact, disposable package.

19. A disposable cutting board, comprising:
    at least one layer of corrugations;
    an absorbent layer attached to a first side of the corrugations;
    a backing sheet attached to a second side of the corrugations;
    a first set of parallel score lines formed in the cutting board; and
    a second set of parallel score lines formed in the cutting board, the second set of parallel score lines intersecting with the first set of parallel score lines.

20. The disposable cutting board of claim 19, wherein the corrugations are manufactured from a cellulosic material.

21. The disposable cutting board of claim 19, wherein the absorbent layer is manufactured from a cellulosic material.

22. The disposable cutting board of claim 19, wherein the backing sheet is manufactured from a plastic material.

23. The disposable cutting board of claim 19, wherein the backing sheet is hydrophilic.

24. The disposable cutting board of claim 19, wherein the backing sheet is oleophilic.

25. A disposable cutting board, comprising:
    a first layer;
    a second layer, wherein the first layer allows for knife penetration without dulling the knife, the second layer requiring greater force to penetrate than the first layer; and
    a score line provided in at least one of the first and second layers, the cutting board being movable between a planar, cutting configuration to a curved, serving configuration by hingedly folding the cutting board about the score line.

26. The disposable cutting board of claim 25, wherein the second layer includes a plurality of corrugations.

27. The disposable cutting board of claim 25, wherein the first layer is manufactured from micro-fibers.

* * * * *